United States Patent [19]

Schwartz

[11] 4,455,757
[45] Jun. 26, 1984

[54] PLUNGER ALIGNMENT FITTING AND METHOD FOR COLD CHAMBER DIE CASTING MACHINE

[76] Inventor: William H. Schwartz, 2111 Acacia Park Dr., Lyndhurst, Ohio 44124

[21] Appl. No.: 345,414

[22] Filed: Feb. 3, 1982

[51] Int. Cl.$^3$ .................................................. G01B 5/25
[52] U.S. Cl. ............................... 33/181 R; 33/169 C; 33/172 D; 33/185 R; 164/150
[58] Field of Search ........... 164/150; 33/172 D, 169 C, 33/181 R, 185 R, 180 R, 180 AT, 181 AT

[56] References Cited

U.S. PATENT DOCUMENTS

| | | | |
|---|---|---|---|
| 1,058,027 | 4/1913 | Anthony | 33/172 D |
| 1,460,279 | 6/1923 | Rosbach | 33/172 D |
| 2,484,801 | 10/1949 | Anderson | 33/169 C X |
| 2,674,146 | 4/1954 | Rice | 33/185 X |
| 3,711,955 | 1/1973 | Holt | 33/181 R |

*Primary Examiner*—William D. Martin, Jr.
*Attorney, Agent, or Firm*—Maky, Renner, Otto & Boisselle

[57] ABSTRACT

A plunger alignment fitting and method for cold chamber die casting machine are characterized by an axial center pointer or indicator and a tube guide therefor which is receivable in the shot chamber of the die casting machine. The tube guide has axially spaced, tapered annular shoulders which are in axial alignment with each other and the center pointer and such shoulders are centered to respective ends of the shot chamber by centering rings or plungers which have circumferentially arranged, equal length bearing elements constrained therein for radial movement. The bearing elements have radially inner and outer bearing ends which respectively engage the tapered shoulders and interior wall of the shot chamber when the centering rings are urged axially towards the shoulders by hand tightenable nuts threaded on the ends of the tube guide. The tube guide accordingly is centered and supported in the shot chamber by the bearing elements. The center pointer includes a center rod which is axially slidable in the tube guide and a hand tightenable, quick connect collet coupling permits easy and quick connection of different length center rod extensions to the center rod. The different length center rod extensions alternately mechanically identify center points on the center axis of the shot chamber for the plunger at extended and retracted positions thereof and the plunger is adjusted to such center points at each alternate position.

39 Claims, 8 Drawing Figures

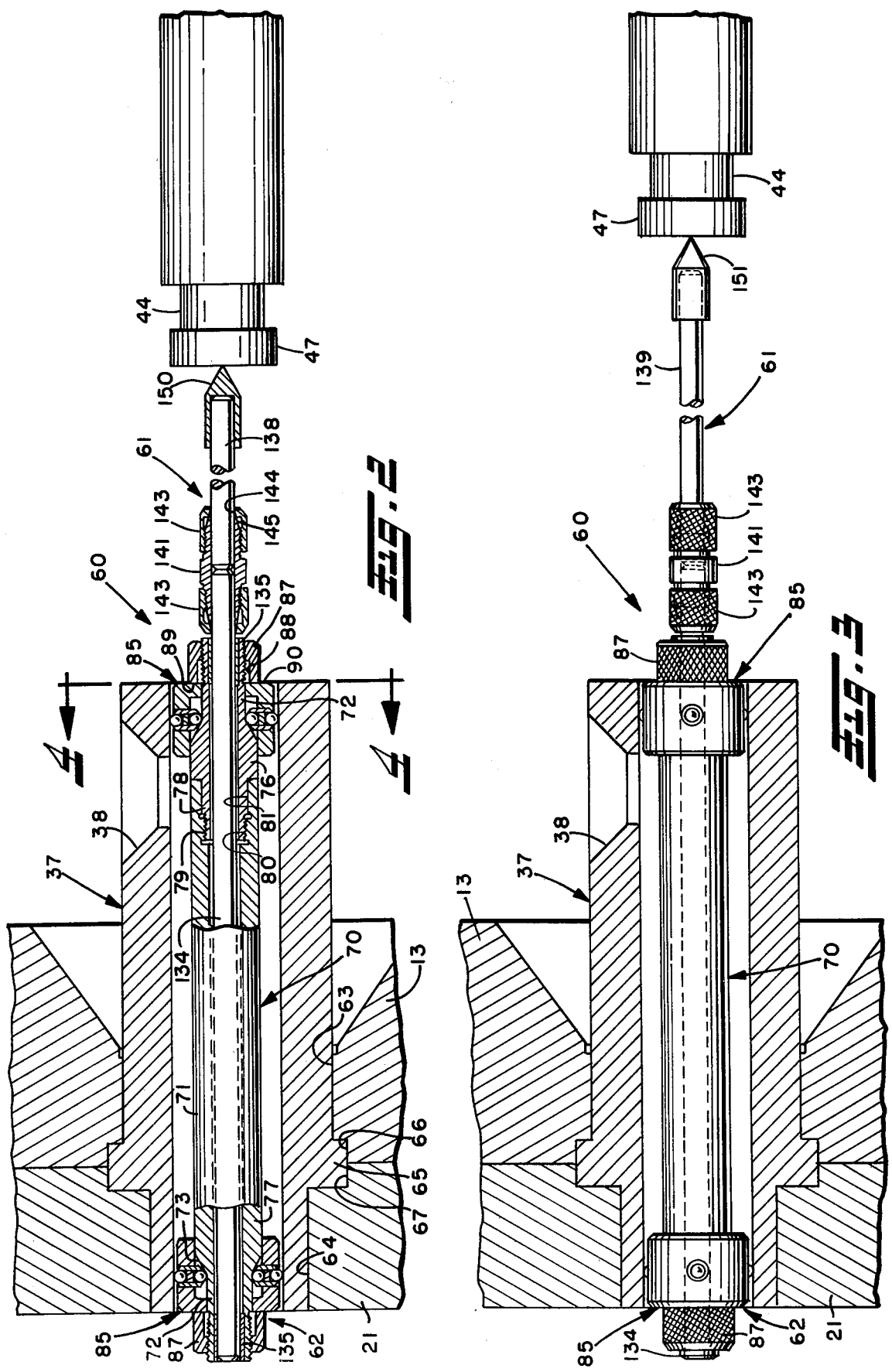

PLUNGER ALIGNMENT FITTING AND METHOD FOR COLD CHAMBER DIE CASTING MACHINE

DISCLOSURE

This invention relates generally to die casting machines and more particularly to a plunger alignment fitting and method for cold chamber die casting machines with a horizontal injection system.

BACKGROUND OF THE INVENTION

In such cold chamber die casting machines, the injection plunger thereof should be in precise axial alignment with the cold or shot chamber thereof or otherwise excessive wear may occur in the injection system and cause premature replacement of parts. The plunger tip and shot chamber are particularly subject to wear and scoring and such may create clearance therebetween through which metal may be spat back and out of the shot chamber. This can be a safety hazard, and particularly a fire hazard when easily ignitable metals such as magnesium are being injected, and such thus renders the machine unsafe. Replacement of the worn parts is costly and time consuming, and replacement of the plunger tip and shot chamber is particularly costly as such parts are made of expensive materials, Moreover, the machine must be idle during replacement of worn parts, and the machine may be out of service for a lengthy period of time if a needed replacement part is not on hand or available.

Machine operation also may be adversely affected when the plunger and shot chamber are out of alignment. Binding between the plunger and shot chamber may occur and cause injection pressure to vary from cycle to cycle to the extent that a defective casting may be formed. This may be disastrous to the die caster particularly if the defect is not readily apparent until machining or plating thereof. In any event, the machine may produce castings of inconsistent quality.

In advanced machine operation, computerized and programmable control systems are widely used. Such systems depend on feed-back from hydraulic pressure feed-back sensors coupled to the hydraulic injection system to control plunger operation. When the plunger and shot chamber are out of alignment, inconsistent and unreliable feed-back information may be supplied and foul up the control systems which are expensive and often finicky.

To align the plunger and shot chamber, it is known to use a sliding rod on the outside of the shot chamber and a dial indicator for making adjustments. To make these adjustments, an experienced mechanic is required and many adjustments may have to be made just to bring the plunger and shot chamber into approximate alignment.

A more sophisticated method and apparatus obtaining a more precise alignment employs a telescope or laser with a fixture inserted in the shot chamber. As the telescope or laser is fitted in the shot chamber, a right angle lens is required for viewing purposes or otherwise the technician must insert his head into the die area which is quite dangerous. In any event, this technique requires skilled technicians and the equipment is quite costly.

SUMMARY OF THE INVENTION

The present invention provides a relatively inexpensive plunger alignment fitting and novel method for obtaining precise alignment of the plunger and shot chamber in a die casting machine. Briefly, the plunger alignment fitting comprises an axial center pointer or indicator receivable in the shot chamber and extending axially therebeyond and a centering device for coaxially centering the center pointer to the shot chamber at opposite ends thereof.

More particularly, the axial center pointer includes a center rod which is guided for axial movement in an elongate tube guide which is receivable in the shot chamber of the die casting machine. The tube guide has axially spaced apart, conical or tapered annular shoulders in axial alignment with each other and the center rod, and the tube guide is centered at such shoulders to respective ends of the shot chamber by centering rings or plungers which have circumferentially arranged, equal length bearing elements constrained therein for radial movement. The bearing elements have radially inner and outer bearing ends which engage the tapered shoulders and interior wall of the shot chamber, respectively, when the centering rings are urged axially towards the shoulders by hand tightenable nuts threaded on the ends of the tube guide. The tube guide accordingly is centered and supported in the shot chamber by the bearing elements.

The invention further is characterized by a quick connect collet coupling which permits easy and quick connection of different length center pointer or rod extensions to the center rod when slidably received and centered as above in the shot chamber. The collet coupling includes a collet which has an axial center bore in which adjacent ends of the center rod and rod extension are aligned and butted and hand tightenable nuts threaded on opposite ends of the collet. The nuts each have a conical or tapered annular inner surface cooperating with a correspondingly tapered annular outer surface on the respective end of the collet to radially inwardly deform such end into frictional holding engagement with the end of the center rod or rod extension. The ends of the collet preferably are axially slotted to form diametrically opposed, axial fingers adapted to grip the ends of the center rod and rod extension in the collet upon hand tightening of the nuts.

According to the method of the invention, the different length rod extensions are alternately connected to the center rod to mechanically identify center points on the center axis of the shot chamber for the plunger at extended end retracted positions thereof. Plunger adjustments are made in each alternate position to center the plunger to such center points, and such adjustments are alternately performed in such positions until no further adjustment is needed to center the plunger in each position upon extension and retraction thereof, whereupon the plunger will be in precise axial alignment with the shot chamber.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 2 is an enlarged fragmentary section through the die casting machine of FIG. 1 showing substantially in section a plunger alignment fitting according to the invention positioned in the shot chamber of such machine and also showing a first adjustment position arrangement thereof;

FIG. 3 is an enlarged fragmentary section through the die casting machine of FIG. 1 similar to that of FIG. 2 showing in elevation the plunger alignment fitting in a second adjustment position arrangement;

DETAILED DESCRIPTION

Figure 1:
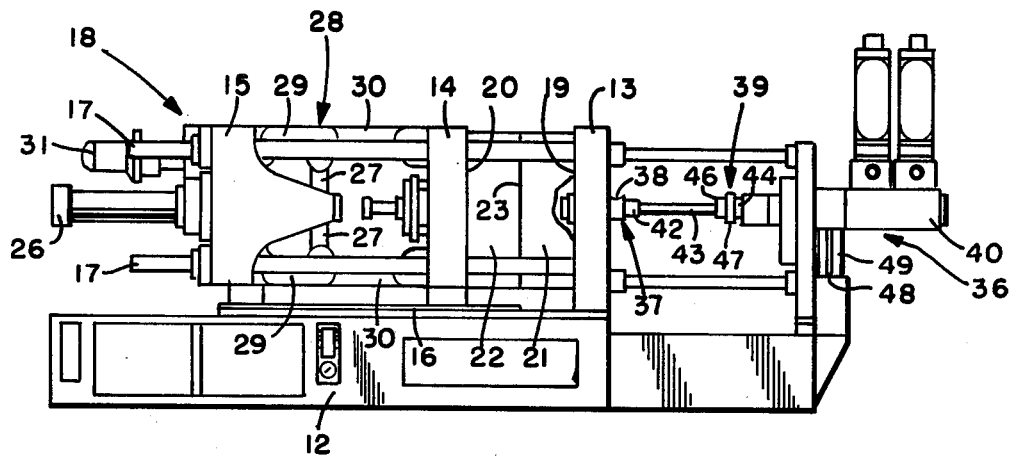
FIG. 1 is a schematic elevation of a cold chamber pressure die casting machine with a horizontal injection system.

Referring now in detail to the drawings and initially to FIG. 1, a cold chamber pressure die casting machine with a horizontal injection system is designated generally by reference numeral 10. The die casting machine generally comprises a base 12, a stationary die plate or platen 13, a movable die plate or platen 14 and a bolster 15. The stationary platen 13 is fixedly mounted on the base and vertically oriented as shown. The bolster 15 is slidably supported by laterally spaced, horizontal tracks 16 on the base for limited horizontal movement towards and away from the stationary platen 13 and is connected to the stationary platen in horizontally spaced relationship by horizontal, parallel tie rods 17. The tie rods 17 extend normal to the stationary platen and two tie rods are provided at each side thereof and vertically spaced as indicated.

The movable platen 14 is positioned between the stationary platen 13 and bolster 15 and is slidably supported by the horizontal tracks 16 on the base 12. The movable platen also is guided for horizontal movement towards and away from the stationary platen by the tie rods 17, such tie rods extending through respective guide bores in the movable platen. The movable platen accordingly is vertically oriented, and the stationary and movable platens 13 and 14 have opposed machined vertical faces 19 and 20 to which stationary and movable dies or die blocks 21 and 22 may be secured, respectively. During horizontal movement of the movable platen for opening and closing the die blocks, the tie rods and guide bores in the movable platen together cooperate to maintain the opposed machined faces 19 and 20 of the platens in parallelism and ensure proper mating of the die blocks along the parting line 23 upon closure thereof.

Opening and closing of the movable and stationary die blocks 21 and 22 is effected by a locking cylinder 26 which is horizontally and centrally mounted in the bolster 15. The piston rod (not shown) of the locking cylinder 26 is pivotally connected to cross links 27 of a toggle linkage assembly 28 which further includes top and bottom sets of short and long toggle links 29 and 30, respectively. The short and long toggle links 29 and 30 have adjacent ends pivotally connected together and to respective cross links 27 and remote ends pivotally connected to the bolster 15 and movable platen 14, respectively. Extension and retraction of the locking cylinder piston rod accordingly extends and retracts the toggle linkage assembly 28 which in turn drives the movable platen towards and away from the stationary platen 13 for closing and opening of the die blocks 21 and 22, respectively, and for applying desired clamp pressure to the die blocks when closed as seen in FIG. 1. For proper application of clamp pressure and for accommodating different die block thicknesses, the bolster 15 is adjustable along the tie rods 17 by a drive motor 31.

Still referring to FIG. 1, the horizontal injection system of the die casting machine is designated generally by reference numeral 36. The injection system 36 includes a cold or shot chamber 37 which is centrally secured in and extends horizontally through the stationary platen 13. The shot chamber 37, at its end projecting outwardly beyond the stationary platen opposite the stationary die block 21, has a top pouring port 38 through which casting material may be loaded into the shot chamber for subsequent injection into the closed and clamped die blocks 21 and 22 by the shot plunger 39 of a horizontal injection cylinder or ram 40.

The shot plunger 39 includes a plunger tip 42 which is movable into and through the shot chamber 37 for injecting the casting material therein into the cavities of the closed and clamped die blocks 21 and 22. The plunger tip 42 is secured to the end of a plunger rod 43 which in turn is secured to the piston rod 44 of the injection cylinder 40 at respective mounting plates or flanges 46 and 47. The injection cylinder 40 is mounted on the base 12 by adjustable vertical posts 48 and 49 which may be adjusted to vary the height and vertical cant of the injection cylinder and thus the shot plunger 39. Other adjustment means which are not shown are also provided to vary the lateral position and horizontal cant of the injection cylinder and thus the shot plunger in relation to the shot chamber 37.

In operation of the injection system, the plunger tip 42 initially is positioned just in and closes the open outer end of the shot chamber 37 which may be charged with casting material. With the die blocks 21 and 22 having been previously clamped closed upon extension of the locking cylinder 26, controlled pressure is applied to the shot injection cylinder 40 whereupon the plunger tip is pushed through the shot chamber for injection of the casting material into the cavities of the closed die blocks. The injection cylinder pressure and hence the injection pressure may be controlled, for example, by a computerized and programmable control system which depends on feed-back from hydraulic pressure sensors coupled to the hydraulic pressure system for the injection cylinder. At the end of the casting operation, the plunger tip is retracted to its original position and the shot chamber is then ready for receipt of another charge of casting material and the next machine cycle.

From the foregoing, it can be appreciated that the plunger tip 42 necessarily must be fitted in the shot chamber 37 within close tolerances so as to preclude injection material from passing therepast and being spat back through the pouring port 38 or open end of the shot chamber during the injection stroke. In addition, the plunger tip should be precisely coaxially aligned with the shot chamber, such alignment being obtained by adjusting the adjustable posts 48 and 49 and the lateral position and horizontal cant adjustment means. If out of alignment, excessive wear and scoring may result and render the machine unsafe and require premature replacement of injection system parts. Binding may also result from the plunger being out of alignment with the shot chamber and such may adversely affect the injection operation, particularly if computerized and programmable controls that rely upon pressure feed-back information are employed.

Referring now to FIGS. 2 and 3, precise axial alignment of the shot plunger 39 to the shot chamber 37 can be easily and quickly achieved with a plunger alignment fitting designated generally by reference numeral 60. The plunger alignment fitting 60 according to the invention generally comprises an axial center pointer or indicator 61 receivable in the shot chamber 37 and extending axially outwardly therebeyond and a centering device 62 which centers the center pointer to the shot chamber at points adjacent opposite ends of the shot chamber. As can be seen in FIGS. 2 and 3, the shot chamber 37 is fitted in respective axially aligned bores 63 and 64 in the stationary platen 13 and die block 21, respectively, and is held therebetween at an annular flange 65 which is fitted in opposed counterbores 66 and 67 in the juxtaposed faces of the stationary platen 13 and die block 21, respectively.

As seen in FIGS. 2 and 3, the centering device 62 includes an elongate tube guide 70 which is receivable in the shot chamber 37. The tube guide 70 has a cylindrical medial portion 71 which tapers radially inwardly at its ends to reduced diameter end portions 72 to form axially spaced apart, conical or tapered annular shoulders 73. The tapered shoulders 73 are in axial alignment with each other and coaxial with the center axis of the tube guide 70.

Figure 6:
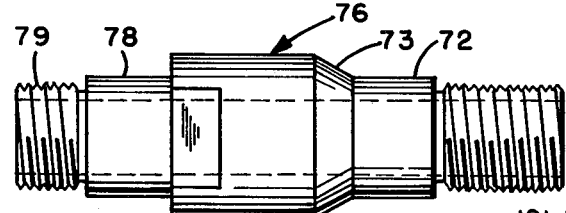
FIG. 6 is an enlarged elevation of one part of the tube guide of the plunger alignment fitting.

When the tube guide 70 is received in the shot chamber 37 as shown, the tapered shoulders 73 preferably are just inwardly adjacent the ends of the shot chamber. As the axial length of shot chambers that may be encountered will vary, the tube guide 70 preferably is formed from two or more axial sections, at least one of which may be interchanged with a corresponding section of a different axial length. As shown, the tube guide is formed from two end sections 76 and 77, each including a respective tapered shoulder 73 and reduced diameter end portion 72. The shorter end section 76 seen in FIG. 6 and at the right in FIG. 2 has an axially inwardly extending, reduced diameter cylindrical guide portion 78 and threaded terminal portion 79. As seen in FIG. 2, the threaded terminal portion 79 and cylindrical guide portion 78 are respectively threadedly received and closely fitted in a threaded bore 80 and cylindrical counterbore 81 in the end of the other or longer section 77 of the tube guide 70. The cylindrical portion 78 and counterbore 81 are precisely machined to a close fit and cooperate to align and maintain the respective shoulders 73 thereon in precise axial alignment.

Still referring to FIGS. 2 and 3, the assembled tube guide 70 is coaxially alignable at its tapered shoulders 73 with the respective ends of the shot chamber by respective centering rings or plungers 85. The centering rings are urged into engagement with the shoulders 73 and interior wall 86 of the shot chamber 37 by plunger nuts 87 threaded on the ends of the reduced diameter end portions 72. The nuts 87 may have counterbores 88 at the flat bearing faces 89 thereof which engage respective flat bearing faces 90 on the centering rings 85. In addition, the outer annular surface of each nut may be knurled to facilitate hand tightening of the nut against the centering rings without the need for tools.

Figures 4, 5:
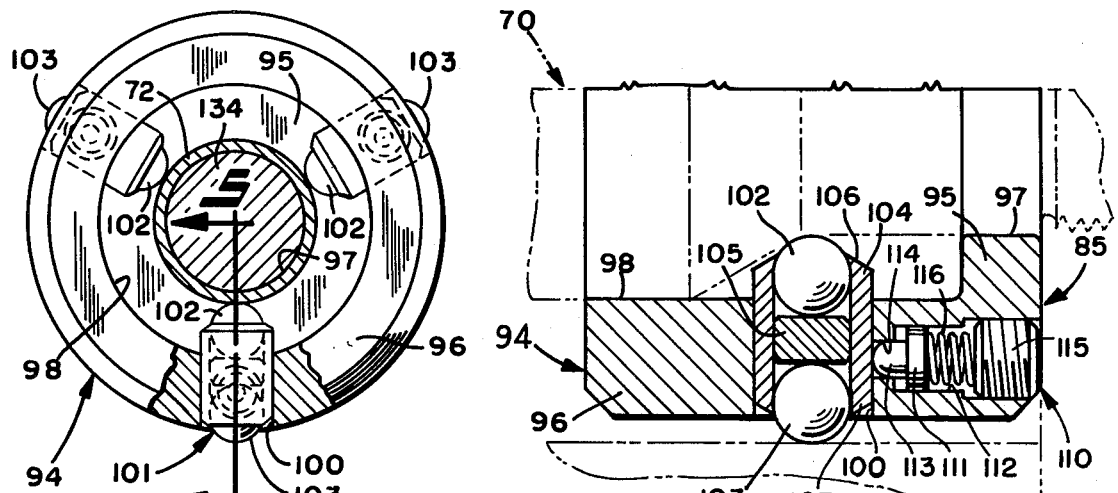
FIG. 4 is an enlarged end elevation of the centering ring of the plunger alignment fitting partially broken away and in section as such would be seen from the line 4—4 of FIG. 2.
FIG. 5 is a radial section through the centering ring of FIG. 4 taken substantially on the line 5—5 thereof.

Referring now additionally to FIGS. 4 and 5, each centering ring 85 can be seen to include a cup-shape bearing housing 94 which has an end or bottom wall 95 and an axially extending annular side wall 96. The end wall 95 has a center bore 97 adapted to closely fit and slide on the respective reduced diameter end portion 72 of the tube guide whereas the inner diameter or interior surface of the side wall 96 is adapted to closely fit and slide on the outer diameter of the medial portion 71 of the tube guide adjacent the respective tapered shoulder 73. In this manner, the housing is maintained in axial alignment with the tube guide and the respective tapered shoulder thereon during axial sliding movement of the housing on the tube guide.

As seen in FIGS. 4 and 5, the side wall 96 of the housing has three equally circumferentially spaced, radial guide holes or bores 100 in which respective bearing elements 101 are constrained for radial movement. The bearing elements 101 are of equal radial length and each include radially inner and outer ball bearings 102 and 103 which project radially inwardly and outwardly beyond the end of a tubular retainer or cartridge 104 therefor. The ball bearings are maintained in proper spaced relationship by a spacer 105 positioned therebetween and are held in the cartridge 104 by the inwardly peened or otherwise inwardly deformed ends 106 and 107 of the cartridge which partially close about the ball bearings 102 and 103, respectively.

Each bearing element 101, which is constrained in a guide bore of the bearing housing 94 for radial movement, is held against falling out of the housing by a spring friction device 110. The spring friction device 110 includes a plunger 111 which is axially movable in a bore 112 in the housing. The plunger 111 has a friction pad or nose piece 113 secured thereto which extends through a small axial bore 114 in the housing into engagement with the side wall of the cartridge 104. Interposed between the plunger and a set screw 115 threaded in the end of the bore 112 opening to the bearing face 90 of the bearing housing 94 is a spring 116 which resiliently urges the plunger 111 towards the cartridge 104 and thus the friction pad 113 into frictional holding engagement with the side wall of the cartridge 104.

Still referring to FIGS. 4 and 5, the bearing elements 101 can be seen to have a radial length greater than the thickness of the side wall 96 of the bearing housing 94 such that the radially inner and outer ball bearings 102 and 103 thereof may be brought into engagement with the tapered shoulder 73 of the tube guide and the interior wall of the shot chamber 37, respectively. As the bearing elements are moved axially towards and into engagement with the tapered shoulders upon tightening of the nuts 87 against the bearing housing 94, the bearing elements may move radially in the bearing housing until they all are firmly engaged between the tapered shoulder and the interior wall of the shot chamber. Accordingly, the bearing elements will center and support the tube guide at its tapered shoulders in the shot chamber at opposite ends thereof, it being appreciated that the bearing elements are of equal radial length as indicated. It further will be appreciated that the bearing elements may be interchanged with bearing elements of a different radial length as needed for use with the different diameter shot chambers that may be encountered. However, it should be apparent that any one set of bearing elements will be useful with a limited range of shot chamber diameters as the bearing elements will ride up on the tapered shoulders until they engage the inner diameter of the shot chamber.

Figures 7, 8:
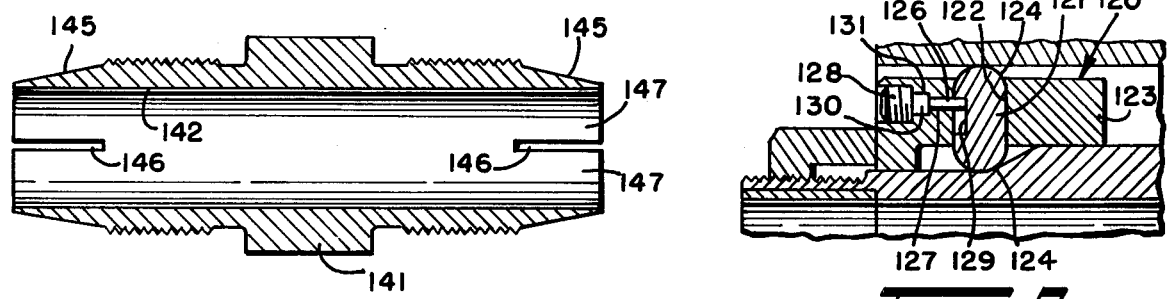
FIG. 7 is an enlarged diametral section through the quick connect collet coupling of the plunger alignment fitting.
FIG. 8 is a fragmentary section through a plunger alignment fitting showing another form of centering ring that may be employed.

Referring now to FIG. 8, another form of centering plunger or ring is shown at 120 and may be used in place of the centering ring 90 as desired. The centering ring 120 is similar to the centering ring 85 except that a different form of bearing element 121 is constrained for radial movement in a respective radial bore 122 in the annular side wall of a bearing housing 123. The bearing element 121 is generally cylindrical and has rounded bearing ends 124 projecting radially inwardly and outwardly beyond the side wall of the housing 123. The radially inner and outer bearing ends are adapted to engage the tapered shoulder 73 and interior wall 86 of the shot chamber 37, respectively, and centering of the tube guide in the shot chamber is thus effected in a manner similar to that above described.

Each bearing element 121 may be prevented from falling out of the bearing housing 123 by a retaining pin or detent 126. The retaining pin 126 is held in an axial bore 127 in the housing by a set screw 128 and projects into a radial slot 129 in the bearing element. The bearing element accordingly is prevented from falling out of the housing by the pin engaging the radially inner and outer ends of the radial slot 129. The pin has an enlarged head 130 received in a counterbore 131 which prevents the pin from being overinserted into the radial slot 129 into engagement with the bottom of such slot so as not to restrict free radial movement of the bearing element in the housing.

Referring now more particularly to the axial center pointer 61, such center pointer can be seen in FIGS. 2 and 3 to include a center rod 134 which is axially slidable in bushings or sleeves 135 fitted in the ends of the tube guide 70 in coaxial alignment with the tube guide. Accordingly, the center rod will be axially aligned with the shot chamber upon centering of the tube guide in the above indicated manner.

The center pointer 61 further includes a center rod extension, and as seen in FIGS. 2 and 3, different length center rod extensions 138 and 139 may be alternately connected to the center rod 134 by a quick connect collet coupling 140. The collet coupling 140 includes a collet 141 which has an axial center bore 142 in which the adjacent ends of the center rod and a rod extension may be received and butted in in-line relationship. Threaded on each end of the collet 141 is a nut 143 which has a conical or tapered annular inner surface 144 which upon tightening of the nut on the collet, cooperates with a correspondingly tapered annular outer surface 145 on the respective end of the collet to radially inwardly deform such collet end into frictional holding or binding engagement with the end of the center rod or rod extension. Each end of the collet preferably is axially slotted as at 146 to form diametrically opposed axial fingers 147 which tightly grip the ends of the center rod and rod extension upon hand tightening of the nuts on the collet. The nuts preferably are knurled at their outer annular surfaces as seen in FIG. 3 to facilitate hand tightening thereof without the need for tools. Accordingly it will be appreciated that the collet coupling provides for quick and easy interchange of different length rod extensions on the center rod.

Having described a preferred form of plunger alignment fitting according to the invention, the use of such fitting for carrying out the method of the invention will now be described with reference to FIGS. 2 and 3. Initially, with the plunger tip 42 and rod 43 of the shot plunger 39 removed from the injection cylinder piston rod 44, the fitting 60 is loosely positioned in the shot chamber 37 and the plunger nuts 87 are hand tightened against the centering rings 85 to center the tube guide 70 to the ends of the shot chamber. With the center rod 134 received in the tube guide, either the short rod extension 138 or long rod extension 139 may be connected to the center rod by the quick connect collet coupling 140. Assuming that the short rod extension 138 is first connected to the center rod, the arrow head 150 at the end thereof will then identify a center point on the center axis of the shot chamber 37 for the shot plunger 39 in an extended position thereof. Preferably, the length of the short rod extension is such that the piston rod 44 may be fully extended and the center rod axially shifted slightly in the tube guide as needed to butt the arrow head 150 against the axial end face of the mounting plate 47 on the end of the piston rod.

The injection cylinder 40 may now be adjusted to match a center marked on the mounting plate 47 to the center point indicated by the arrow head 150, such mounting plate center being on the axis of the piston rod 44. When a match is obtained, the piston rod 44 may then be retracted and the long rod extension 139 coupled to the center rod 134 in place of the short rod extension 138. The length of the long rod extension preferably is such that the piston rod 44 may be fully retracted and the center rod axially shifted in the tube guide 70 as needed to bring the arrow head 151 at the end of the long rod extension into abutment with the end face of the mounting plate 47. The injection cylinder 40 then again may be adjusted to match the mounting plate center to the center point indicated by the arrow head 151. Once a match is obtained, the short rod extension 138 may again be connected to the center rod, the piston rod extending and any further adjustments made to match the center of the mounting plate to the indicated center point.

Adjustment of the injection cylinder in each position thereof alternately continues until no further adjustment is needed to match the mounting plate center to the indicated center point in each position upon extension and retraction of the piston rod 44. This may take only a few adjustments or more depending on how much the shot plunger was originally out of alignment. When no further adjustments are indicated, the axis of the piston rod then will be in precise axial alignment with that of the shot chamber 37. Accordingly, the plunger tip 42, once secured to the piston rod in axial alignment therewith as indicated, also will be in precise axial alignment with the shot chamber.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the following claims.

The embodiments of the invention in which an exclusive property or privilege is claimed are defined as follows:

1. A plunger alignment fitting for a machine including a chamber and a plunger movable in the chamber such as a die casting machine or the like, said fitting comprising an axial center indicator for the plunger, alignment means for mounting said center indicator and receivable in the chamber, said alignment means having axially spaced, tapered shoulders in axial alignment with each other and said center indicator, and centering means each engageable with a respective one of said shoulders and the interior wall of the chamber for centering said shoulders to respective ends of the chamber, whereby said center indicator will be axially aligned with the chamber.

2. A fitting as set forth in claim 1 wherein each said centering means includes a centering ring on the respective end of said alignment means and means for axially urging said centering ring into engagement with the respective shoulder and interior wall of the chamber.

3. A fitting as set forth in claim 2 wherein said centering ring includes an annular bearing housing and a plurality of circumferentially arranged bearing elements constrained in said housing for radial movement, said bearing elements each having radially inner and outer ends engageable respectively with the respective said shoulder and interior wall of the chamber.

4. A fitting as set forth in claim 3 wherein said bearing elements are received in radial guide bores in said bearing housing, and further including spring friction means for holding said bearing elements against radially falling out of said guide bores.

5. A fitting as set forth in claim 4 wherein said spring friction means includes a friction pad movable axially in said housing and means for resiliently urging said friction pad into engagement with a respective bearing element.

6. A fitting as set forth in claim 3 wherein said bearing elements are received in radial guide bores in said bearing housing, and further including detent means projecting axially into a radial slot in a respective bearing element for preventing said bearing element against radially falling out of said guide bores.

7. A fitting as set forth in claim 6 wherein said detent means includes a pin received in an axial bore in said housing and extending into said radial slot.

8. A fitting as set forth in claim 3 wherein each bearing element includes a tubular cartridge received in a respective radial bore in said bearing housing and radially inner and outer ball bearings retained in respective radial ends of said cartridge and projecting radially therebeyond.

9. A fitting as set forth in claim 8 wherein each bearing element further includes spacer means in said cartridge for maintaining said ball bearings radially spaced apart.

10. A fitting as set forth in claim 8 wherein said ball bearings are retained in said cartridge by inwardly deformed ends of said cartridge.

11. A fitting as set forth in claim 3 wherein each bearing element is cylindrical and received in a respective radial bore in said housing for radial movement, and has rounded radially inner and outer ends adapted to engage the respective said shoulder and interior wall of the chamber, respectively.

12. A fitting as set forth in claim 3 wherein there are at least three bearing elements equally circumferentially spaced in said housing and of equal radial length.

13. A fitting as set forth in claim 2 wherein said means for axially urging includes a hand tightenable nut threaded on the respective end of said alignment means.

14. A fitting as set forth in claim 1 wherein said alignment means includes a tubular guide for said center indicator, and said center indicator is axially slidable in said tubular guide.

15. A fitting as set forth in claim 14 wherein said tubular guide has a cylindrical medial portion which tapers radially inwardly at its ends to reduced diameter end portions to form said tapered shoulders.

16. A fitting as set forth in claim 15 wherein said tubular guide is formed from at least two interconnected axial sections, at least one of which may be interchanged with a corresponding section of a different axial length for use with chambers of different axial lengths.

17. A fitting as set forth in claim 16 wherein each of two axial sections includes a respective shoulder and reduced diameter end portion.

18. A fitting as set forth in claim 14 wherein each said centering means includes a centering ring on the respective ends of said tubular guide and means for axially urging said centering ring into engagement with the respective said shoulder and interior wall of the shot chamber.

19. A fitting as set forth in claim 18 wherein said centering ring includes an annular bearing housing and a plurality of circumferentially arranged bearing elements restrained in said housing for radial movement, said bearing elements each having radially inner and outer ends engageable respectively with the respective said shoulder and interior wall of the shot chamber.

20. A fitting as set forth in claim 19 wherein said tubular guide has a cylindrical medial portion which tapers radially inwardly at its ends to reduced diameter end portions to form said tapered shoulders.

21. A fitting as set forth in claim 20 wherein said bearing housing has an inner diameter surface closely fitted and slidable on the outer diameter surface of said medial portion for maintaining said housing in axial alignment with said tubular guide.

22. A fitting as set forth in claim 21 wherein said means for axially urging includes a hand tightenable nut threaded on the respective reduced diameter end portion.

23. A fitting as set forth in claim 14 wherein said center indicator includes a center rod axially movable in said tubular guide, different axial length center rod extensions, and coupling means for alternately coupling each rod extension to said center rod in axial alignment therewith.

24. A fitting as set forth in claim 23 wherein said coupling means includes a quick connect collet coupling.

25. A fitting as set forth in claim 24 wherein said collet coupling includes a collet having an axial center bore for receipt of adjacent ends of said center rod and a center rod extension, and means for radially inwardly deforming the ends of said collet into holding engagement with the respective adjacent ends of said center rod and rod extension.

26. A fitting as set forth in claim 25 wherein said means for radially inwardly deforming includes a nut threaded on each end of said collet, each nut having a tapered annular inner surface cooperating with a correspondingly tapered annular outer surface on the respective end of said collet to radially inwardly deform such respective end.

27. A fitting as set forth in claim 26 wherein said nut is hand tightenable.

28. A fitting as set forth in claim 25 wherein each end of said collet is axially slotted to form circumferentially arranged axial fingers adapted to grip the end of said center rod or rod extension.

29. A fitting as set forth in claim 23 including an arrow head on the end of each rod extension for indicating a center point on the center axis of the chamber.

30. A fitting as set forth in claim 1 wherein said center indicator includes a center pointer axially aligned by said alignment means and centering means with the chamber, said center pointer having a removable pointer extension extending axially beyond said alignment means and being interchangeable with another pointer extension of a different axial length.

31. A fitting as set forth in claim 30 wherein said pointer extension is interchangeable by means of a quick connect collet coupling.

32. A plunger alignment fitting for a machine including a chamber and a plunger movable in the chamber, comprising an axial center pointer receivable in the chamber and indexing axially therebeyond, and the means for axially aligning said pointer with the chamber at the opposite ends thereof.

33. A fitting as set forth in claim 32 wherein said means for aligning includes a tube guide in which said center pointer is coaxially slidable and centering means for centering the ends of said tube guide to the respective ends of the chamber.

34. A fitting as set forth in claim 33 wherein said center pointer includes a center rod slidable in said tube guide, different axial length center rod extensions, and coupling means for alternately coupling each rod extension to said center rod in axial alignment therewith.

35. A fitting as set forth in claim 34 wherein said coupling means includes a quick connect collet coupling.

36. A method for axially aligning the shot plunger of a die casting machine to the shot chamber thereof, comprising the steps of:
   (a) mechanically identifying the center axis of the shot chamber for the plunger at extended and retracted positions thereof; and
   (b) adjusting the plunger center to correspond to each position.

37. A method as set forth in claim 36 wherein step (a) includes axially aligning an axial center pointer within the shot chamber and alternately connecting different length pointers to obtain the extended and retracted positions.

38. The method of claim 37 wherein the step of axially aligning includes centering the ends of a guide tube in which the center pointer is axially slidable.

39. The method of claim 37 wherein the step of alternately connecting includes using a quick connect collet coupling to effect such alternate connecting of different length pointers.

* * * * *